United States Patent
Sciammarella et al.

[19]

[11] Patent Number: 6,052,110

[45] Date of Patent: Apr. 18, 2000

[54] DYNAMIC CONTROL OF ZOOM OPERATION IN COMPUTER GRAPHICS

[75] Inventors: Eduardo Sciammarella; Tom Grauman, both of New York; Nghi Doan, Bronx, all of N.Y.

[73] Assignees: Sony Corporation, Tokyo, Japan; Sony Electronics, Inc., Park Ridge, N.J.

[21] Appl. No.: 09/075,664

[22] Filed: May 11, 1998

[51] Int. Cl.[7] .................................................. G09G 5/08
[52] U.S. Cl. .......................... 345/145; 345/146; 345/339
[58] Field of Search .................................. 345/145, 146, 345/339, 341, 439, 125, 131

[56] References Cited

U.S. PATENT DOCUMENTS

| | | | |
|---|---|---|---|
| 5,880,722 | 3/1999 | Brewer et al. | 345/145 |
| 5,910,801 | 6/1999 | Rosenburg et al. | 345/339 |

*Primary Examiner*—Richard A. Hjerpe
*Assistant Examiner*—Ronald Laneau
*Attorney, Agent, or Firm*—Frommer Lawrence & Haug, LLP.; William S. Frommer

[57] ABSTRACT

Various objects, images, pictures, etc. are selectively enlarged or reduced on a screen using a zoom operation. To view an object, for example, on the screen with less details or more details than the current display of the object, a cursor positioned on the screen display using an input device is utilized to fix a reference location located on a circle of a predetermined diameter. By moving the cursor on the screen display, a line between the cursor and the reference location is provided. The direction of the line indicates direction of the zoom operation: if the line is inside the circle, the object is zoomed-out, and if the line is outside the circle, the object is zoomed in. The length of the line determines speed of the zoom operation.

18 Claims, 8 Drawing Sheets

DYNAMIC CONTROL OF ZOOM OPERATION IN COMPUTER GRAPHICS

BACKGROUND OF THE INVENTION

The invention is related to computer graphics and, in particular, a user interface using computer graphics in various applications such as Computer-Aided-Design (CAD), for example, for performing a number of operations on a screen display.

A user interface provides, among other things, an interface between a computer user and an application program executing via an operating system of the computer. In the absence of a user interface, the computer user has to learn application program commands and/or operating system commands which often require some technical expertise and knowledge. Instead of entering line commands to run an application program, to add a peripheral device, to activate a "Web" browser to connect to the Internet's World Wide Web, etc., the user interface allows even a computer novice to carry out these and other operations on the computer with ease and simplicity.

It is well known that via the user interface the user can, for example, view, manipulate, etc. images and graphical objects on a display screen via an input device such a mouse, light pen, keyboard, joystick, etc. coupled to the computer. Various operations associated with the images and objects are available to the user. For example, by selecting ("clicking" on) a particular object ("icon") on the screen, the user may start running an application program, change a screen or a set-up configuration of the computer, manage files in various directories and sub-directories, etc. One of the operations that the user interface of an application program with graphical images may provide is a so-called "zoom" or "zooming" operation which is explained hereinbelow.

Figure 1A:
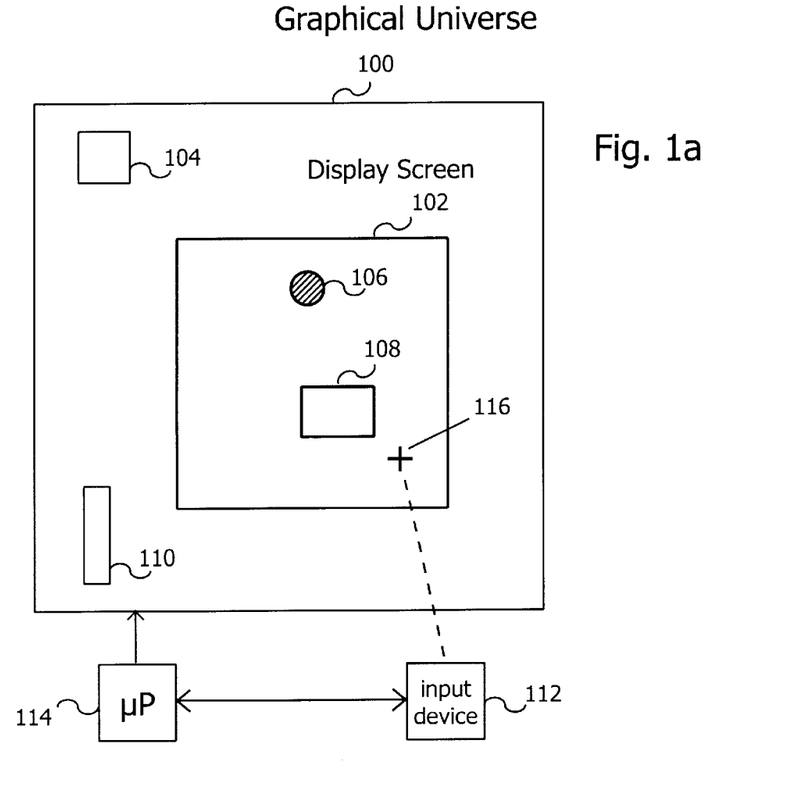
FIG. 1a shows a relationship between a graphical universe and a display screen.
Figure 1B:
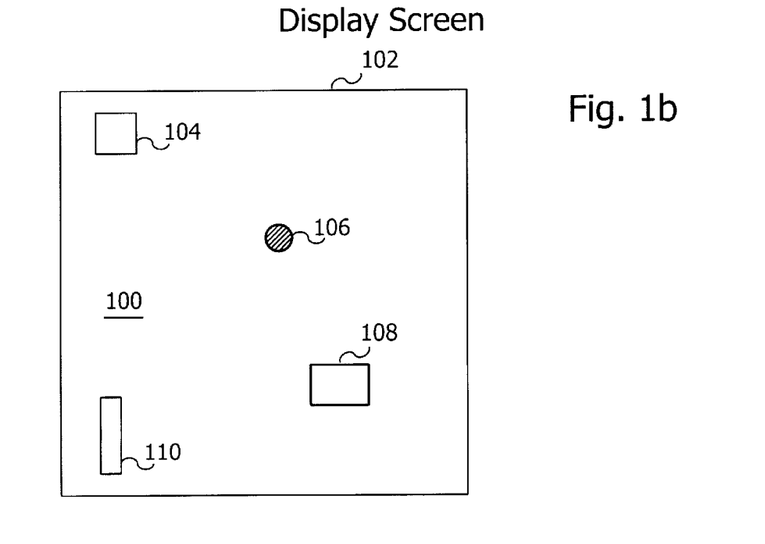
FIG. 1b shows the result of a zoom-out operation whereby the entire graphical universe is displayed on the display screen.

FIG. 1 shows a graphical universe 100 that is much larger than the display screen 102 of a computer monitor, television set, etc. The entire universe 100 may be available to the user for arranging, for example, various images/objects 104, 106, 108, 110 (as represented by icons) corresponding to application programs, images, files, etc. At a particular point in time, as shown in FIG. 1a, the user views only several objects 106, 108 at one time. When the user wants to view the entire universe 100 on the display screen 102, all the objects 104, 106, 108, 110 in the universe 100 should "fit" on the display screen 102. To achieve this, he "zooms out" from his current display (picture) on the display screen 102. That is, the universe 100 "shrinks" on the display screen 102, as shown in FIG. 1b, whereby the objects 104, 106, 108, 110 are reduced in size while maintaining their relative positioning in the graphical universe 100. As shown in FIG. 1b, the entire universe 100 is shown on the display screen 102. Conversely, if the user is only interested in a detailed view of a particular object, he "zooms in" to the object-in-interest. That is, the universe 100 "expands" on the display screen 102, whereby the object-in-interest (picture) is enlarged.

The above-described conventional zoom operations entail several drawbacks. For once, the user cannot zoom in/out with a single operation, and typically two different operations are required. For example, the user selects an item, such as a graphical representation of a magnifying glass, that signifies a zoom-in operation. If the user wants to zoom-out, he has to access another item in order to activate and perform that operation. In addition, speed with which zoom operations are performed cannot be dynamically controlled by the user.

A need therefore exists for a user interface with graphics containing features that overcome the above disadvantages.

OBJECTS OF THE INVENTION

It is an object of the present invention to provide a zoom operation in computer graphics.

It is another object of the present invention to dynamically control speed and direction of a zoom operation in computer graphics.

SUMMARY OF THE INVENTION

These and other objects, features and advantages are accomplished by apparatus for displaying a graphical space. The inventive apparatus includes a screen display for displaying the graphical space and a programmable controller for positioning a cursor at a preselected position on the screen display such that a reference location is fixed at the preselected position. The programmable controller is operative to provide an object defining a predetermined area on said screen display, while the reference location is substantially located on a border of the predetermined area. The programmable controller is further operative to move the cursor from the reference location on the screen display in a direction in which the graphical space is to be selectively enlarged or reduced on the screen display such that a line between the cursor and the reference location is provided on the screen display to indicate the direction. The programmable controller is further operative to selectively display the enlarged or reduced graphical space the screen display on the basis of the line.

In accordance with one aspect of the present invention, the screen display displays the reduced graphical space when the line is located inside the object, and said screen display displays the enlarged graphical space when the line is located outside the object.

In accordance with another aspect of the present invention, the programmable controller is operative to vary a display speed of selectively displaying the enlarged or reduced graphical space on said screen display in response to a length of the line. The length of the line is indicative of the display speed.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which.

In all Figures, like reference numerals represent the same or identical components of the present invention.

DETAILED DESCRIPTION OF THE PREFERRED EMBODIMENTS

FIG. 1a shows the graphical universe 100 containing various graphical objects 104, 106, 108, 110 representing operations corresponding to each object. As mentioned above, such operations as starting an applications program, activating a modem, sorting files, etc. may be carried out by selecting (clicking on) a corresponding object. Also shown in FIG. 1a is the display screen 102. The user can view a portion of the universe 100 to perform the above-described operations using the objects 106, 108 in view. Alternatively, new objects may be created in the displayed portion of the universe 100, existing objects deleted or modified, etc.

FIG. 1a further shows a cursor 116 responsive to an input device 112, such as a mouse, operated by the user. The input device 112 is controlled by a microprocessor 114. The graphical operations associated with the graphical universe 100 and/or display screen 102 are carried out via the microprocessor 200.

Figure 2:
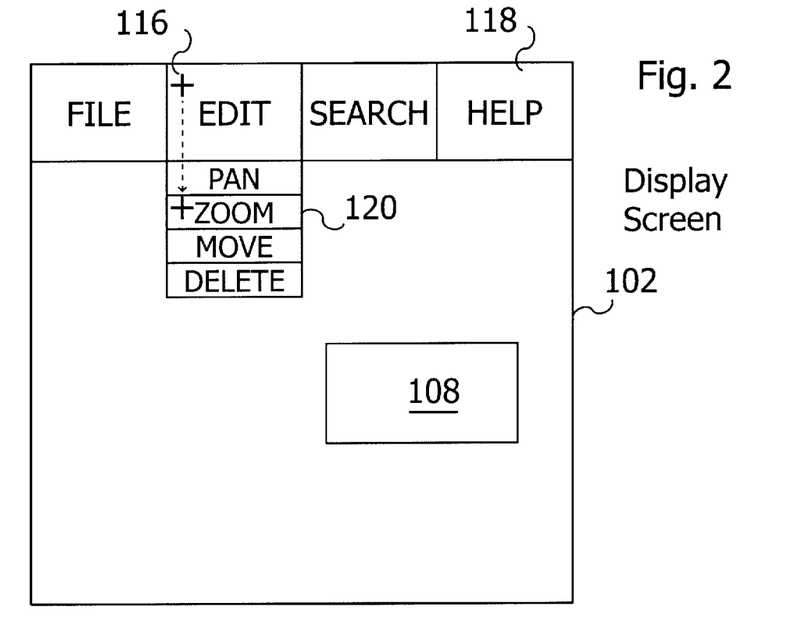
FIG. 2 illustrates a display screen with a toolbar for selecting a zoom operation according to one aspect of the present invention.

According to one aspect of the present invention, the user, via the input device 112, positions the cursor 116 on a portion 118 (a so-called toolbar) on the display screen 102 as illustratively shown in FIG. 2. From the toolbar, a zoom operation according to the present invention may be selected by moving the cursor 116 to an appropriate item in a pull-down menu, such as a sub-menu 120, and clicking on "ZOOM" of the sub-menu 120, for example, as shown in FIG. 2.

Figure 3:
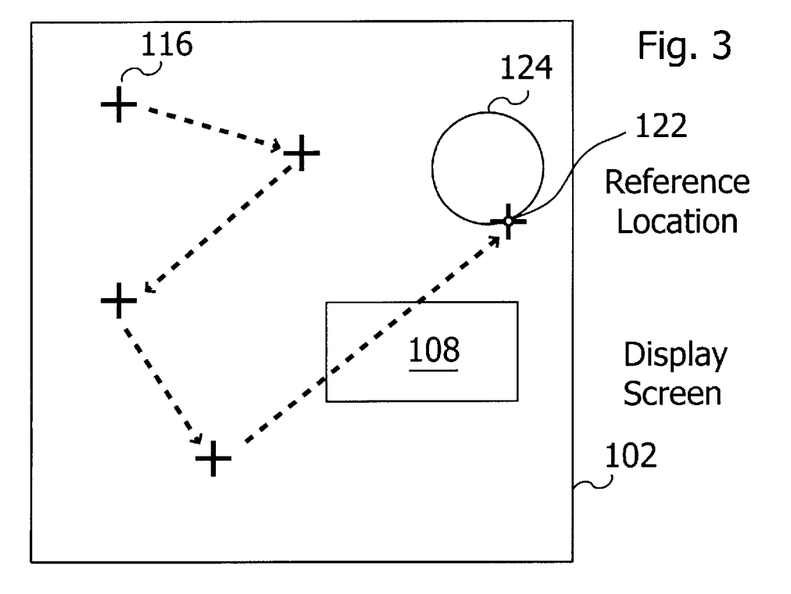
FIG. 3 illustrates how the user moves a cursor on the display screen and establishes a reference location and a circle according to present invention.

When the user selects the zoom operation, the cursor 116 as manipulated via the input device 112 appears on the display screen 102 as shown in FIG. 3. The cursor 116 can be freely moved on the display screen 102 to any position thereon, as shown by the dashed arrows in FIG. 3. Once a particular position is selected on the display screen 102, the user further activates the input device 112 (clicks the mouse button, for example). By clicking on the mouse button, a reference location (point) 122 and a ring 124 (circle) having a predetermined diameter at the current position of the cursor 116 is fixed on the display screen 102 as shown in FIG. 3. The reference location 122 is located on the circumference of the ring 124. While the reference location 122 is representatively shown as a dot, it is understood, of course, that any graphical object may be chosen to represent the reference location. FIG. 3 shows that the cursor 116 is located substantially near or at the reference location 122. While holding the mouse button depressed (or alternatively, by clicking on the mouse button), the user can move the cursor 116 away from the reference location 122 in any direction on the display screen 102. For example, by operating the input device 112, the cursor 116 can be moved in north, south, east and west directions and in any other direction in-between with the full range of 360 degrees with respect to the reference location 122.

Figure 4A:
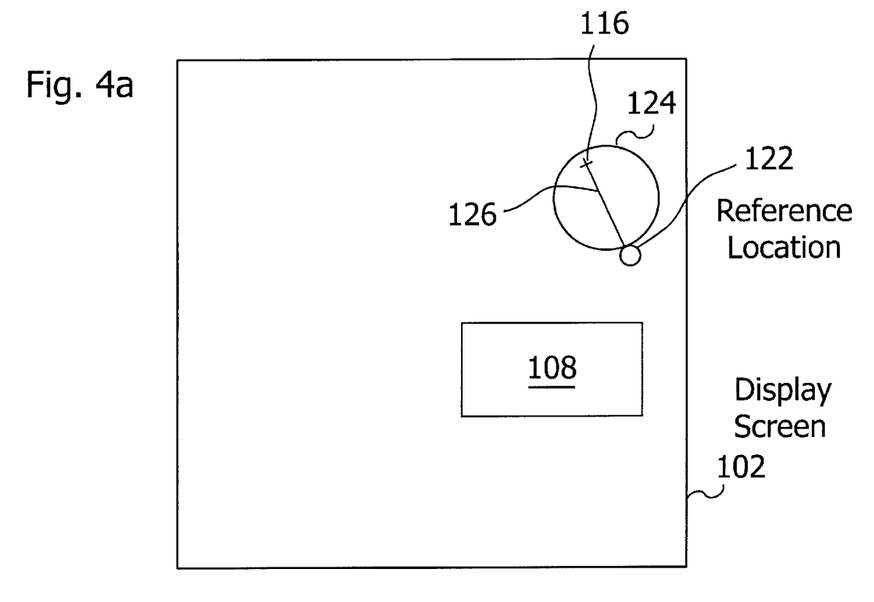
FIG. 4a shows a direction line provided on the display screen when the user moves the cursor away from the reference location in accordance with the present invention.

As the cursor 116 is moved away from the reference location 122, a direction line 126 appears on the display screen 102 as shown in FIG. 4a. The direction line 126 extending between the reference location 122 and the cursor 116 indicates whether a zoom-in operation or a zoom-out operation is carried out.

Figure 4B:
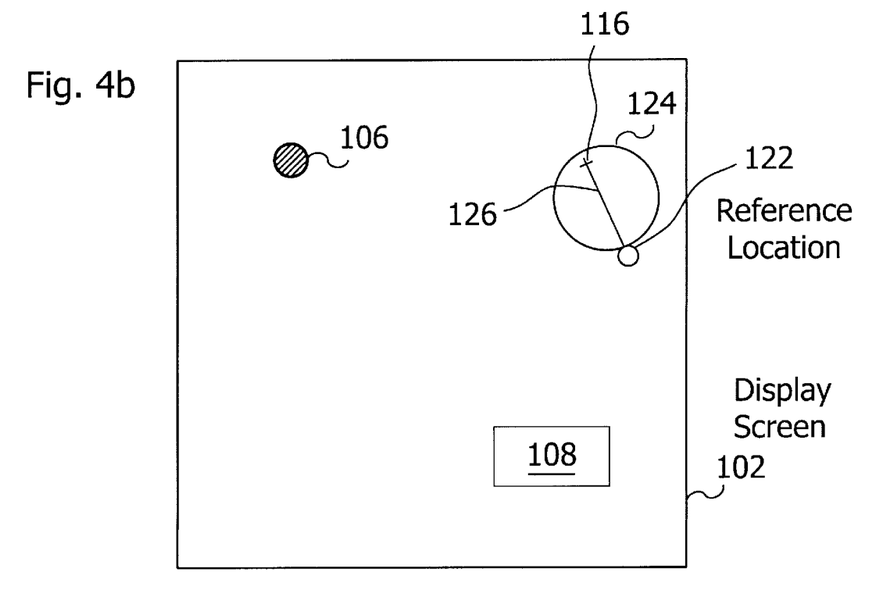
FIG. 4b shows a zoom-out operation when the direction line is inside the circle.

In particular, according to one embodiment of the present invention, the cursor 116 may be placed inside the ring 124 using the input device 112 as shown in FIG. 4a. That is, the direction line 126 that joins the reference location 122 on the circumference of the ring 124 and the cursor 116 is located inside the ring 124. As a result of the direction line 126 being inside the ring 124, the objects on the display screen 102 are zoomed-out as illustrated in FIG. 4b.

Namely, to zoom-out from the objects, the user using the input device 112 moves the cursor 116 inside the circumference of the ring 124. As the direction line 126 between the reference location 122 and the cursor 116 is inside the ring 124, the user receives a visual indication of the zoom-out operation. Therefore, the reduced objects, images, pictures, etc. are displayed on the display screen 102.

Figure 4C:
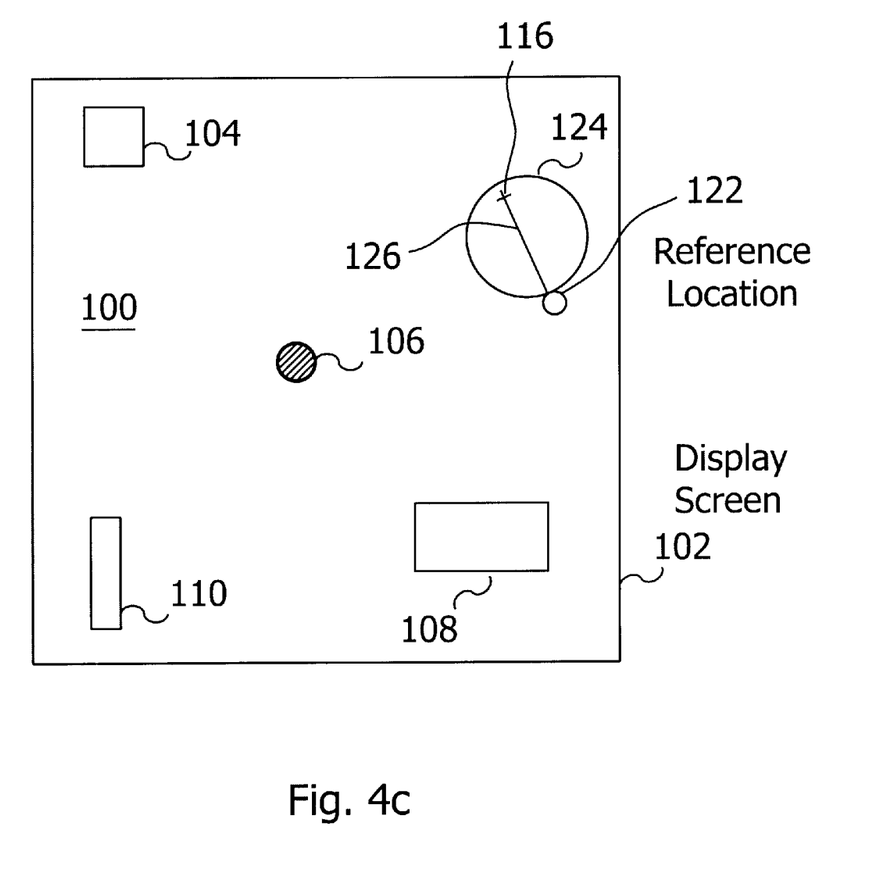
FIG. 4c shows that the zoom-out operation of FIG. 4b continues when the direction line is inside the circle.

As long as the input device 112 is activated (the mouse button is depressed, the mouse button has been clicked, etc.) and the direction line 126 is inside the ring 124, the zoom-out operation continues until the entire universe 100 is displayed. FIG. 4c shows the entire universe 100 with the objects 104, 106, 108, 110 being displayed on the display screen 102.

Figure 5A:
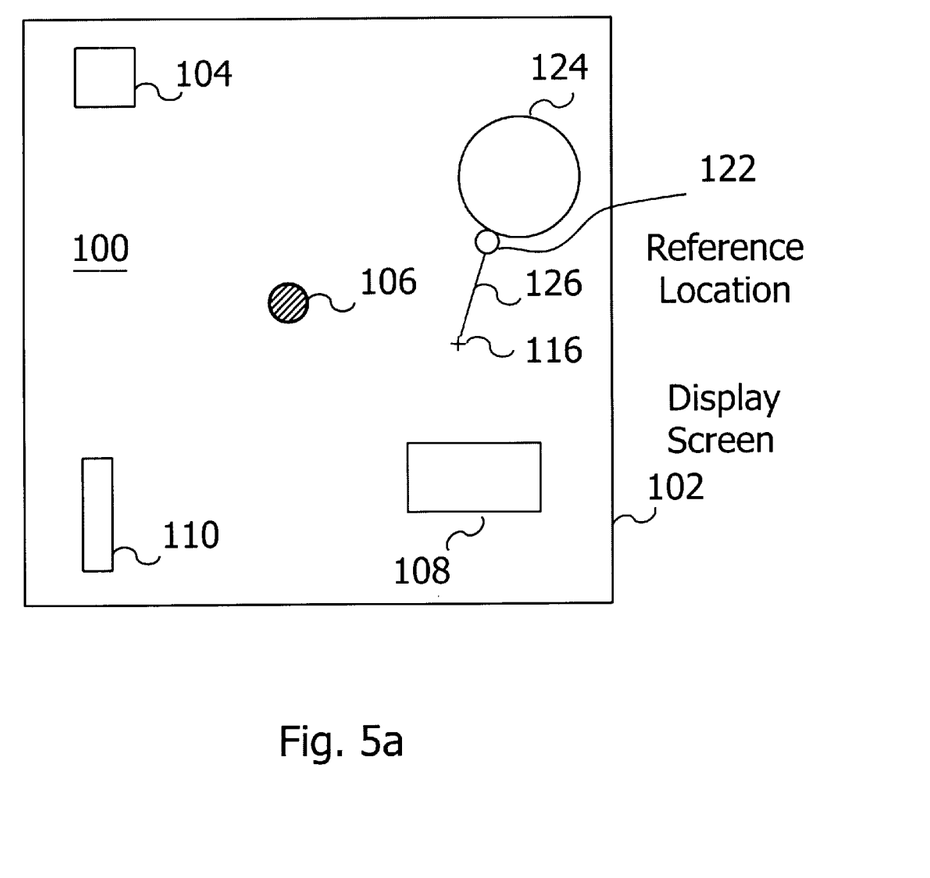
FIGS. 5a–5c show a zoom-in operation when the direction line is outside the circle according to the present invention.

Conversely, to zoom-in to the object, the user using the input device 112 moves the cursor 116 outside the circumference of the ring 124 as shown in FIG. 5a. The direction line 126 is formed between the reference location 122 and the cursor 116 on the outside of the ring 124. This indicates that the zoom-in operation is in progress.

Figure 5B:
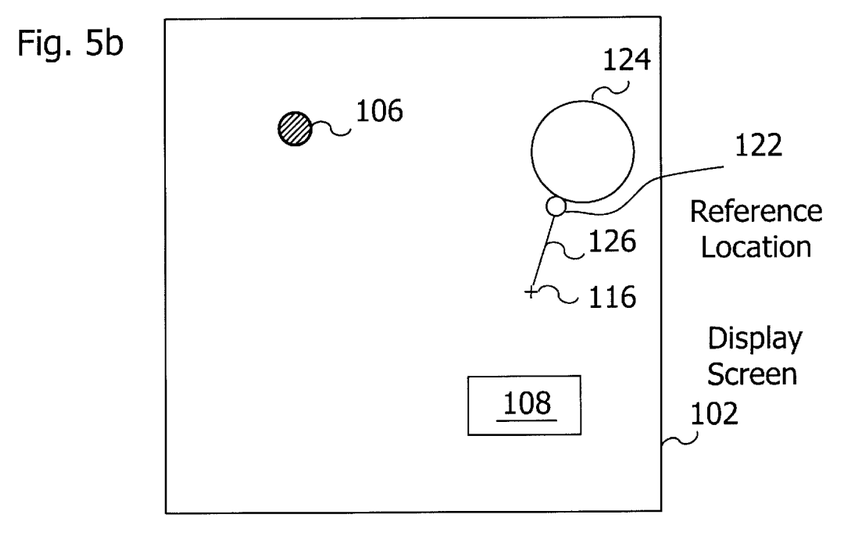
Figure 5C:
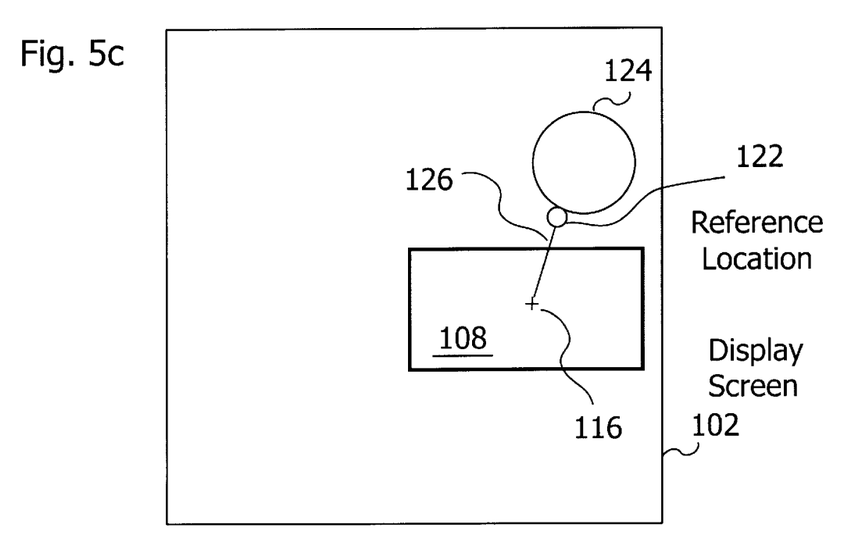

Similar to the above, as long as the input device 112 is activated (the mouse button is depressed, has been clicked, etc.) and the direction line 126 is outside the ring 124, the zoom-in operation continues until some predetermined limit is reached. FIGS. 5b and 5c show the continuous zoom-in operation on the object 108 by keeping the cursor 116 outside the ring 124.

Figure 6A:
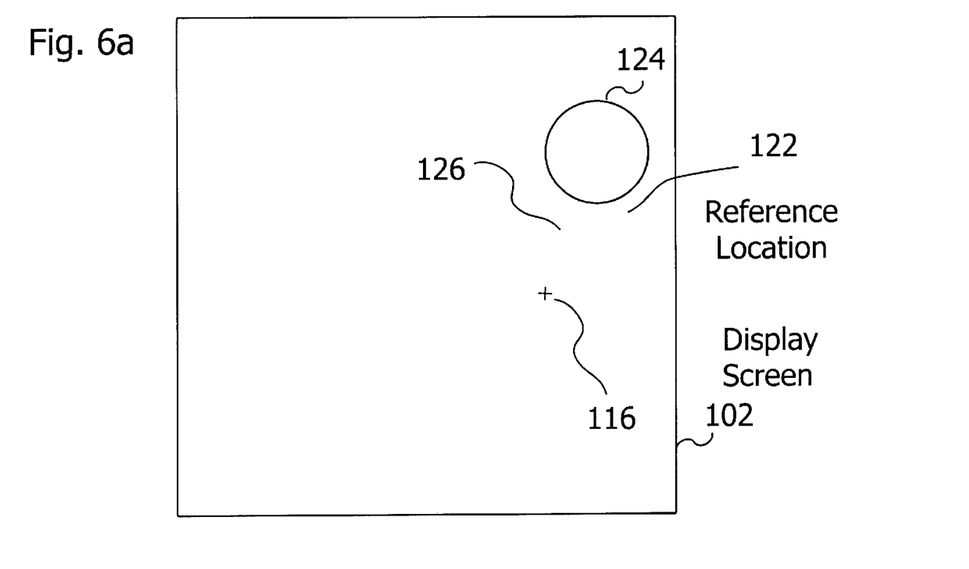
FIGS. 6a, 6b show the speed with which the zoom-out operation occurs on the basis of the length of the direction line.
Figure 6B:
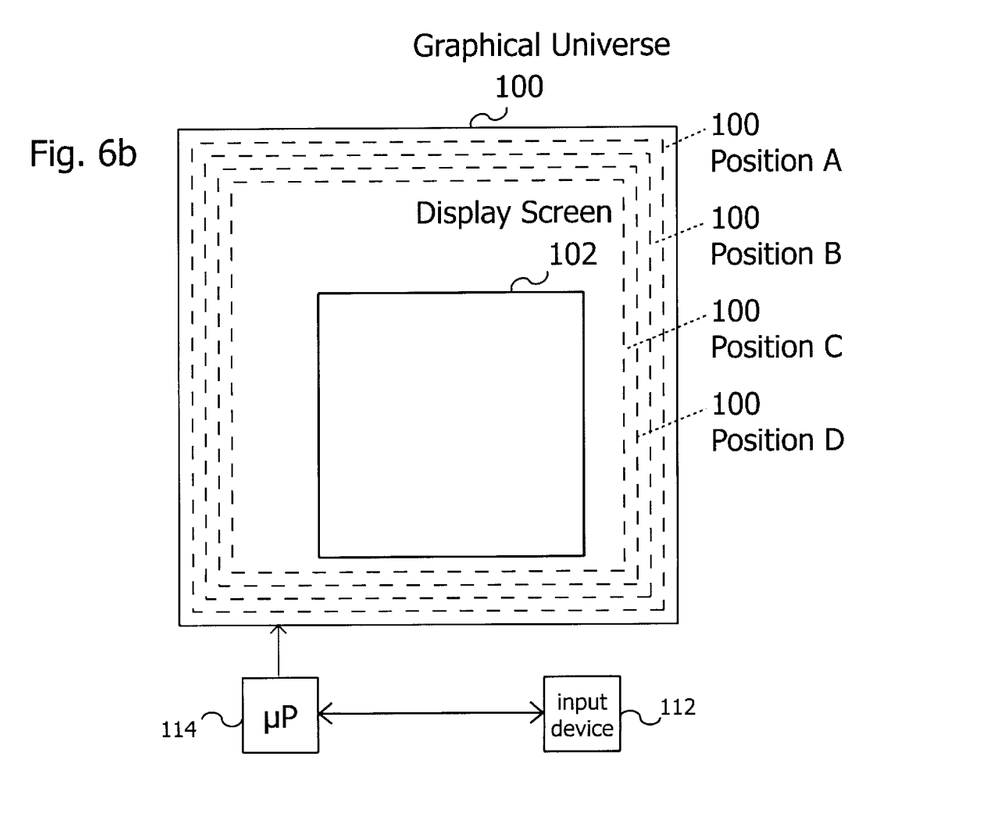

In another aspect of the present invention, the length of the direction line 126 indicates speed with which zoom-in and zoom-out operations occur, that is, how fast or slow the objects, images, pictures, etc. are enlarged or reduced on the display screen 102. The length of the direction line 126 is changed via the input device 112 (the movement of the mouse). If the direction line 126 is short as shown in FIG. 6a, the zoom-in/out operation is performed slowly. FIG. 6b shows that the graphical universe 100 is continuously reduced at a slow speed during the zoom-out operation for display at the display screen 102. Even though FIG. 6b shows discrete positions A, B, C, D of the graphical universe 100 during the zoom-out operation, it is for illustrative purposes only and it is understood that during the zoom-in/out operations the graphical universe 300 is reduced/expanded on a continuous basis.

Figure 7A:
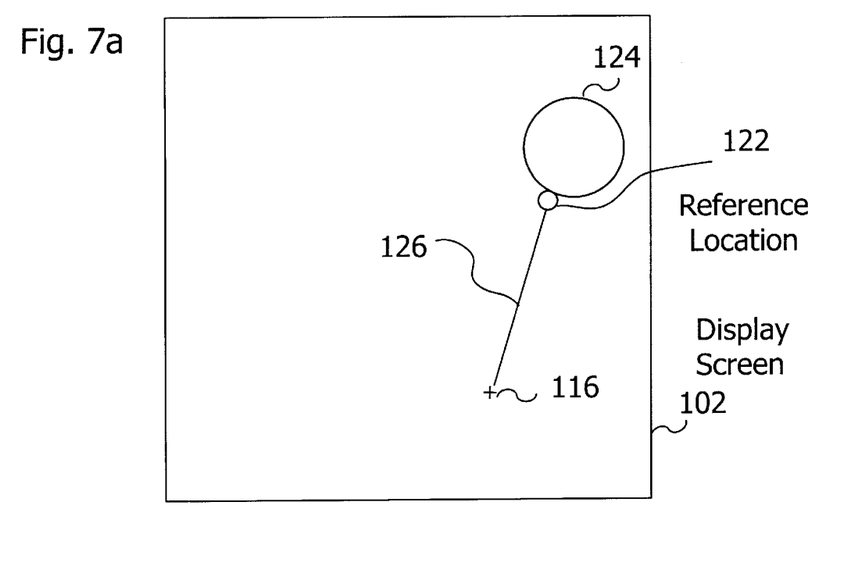
FIGS. 7a, 7b show the slow speed of the zoom-out operation as the length of the direction line is decreased.
Figure 7B:
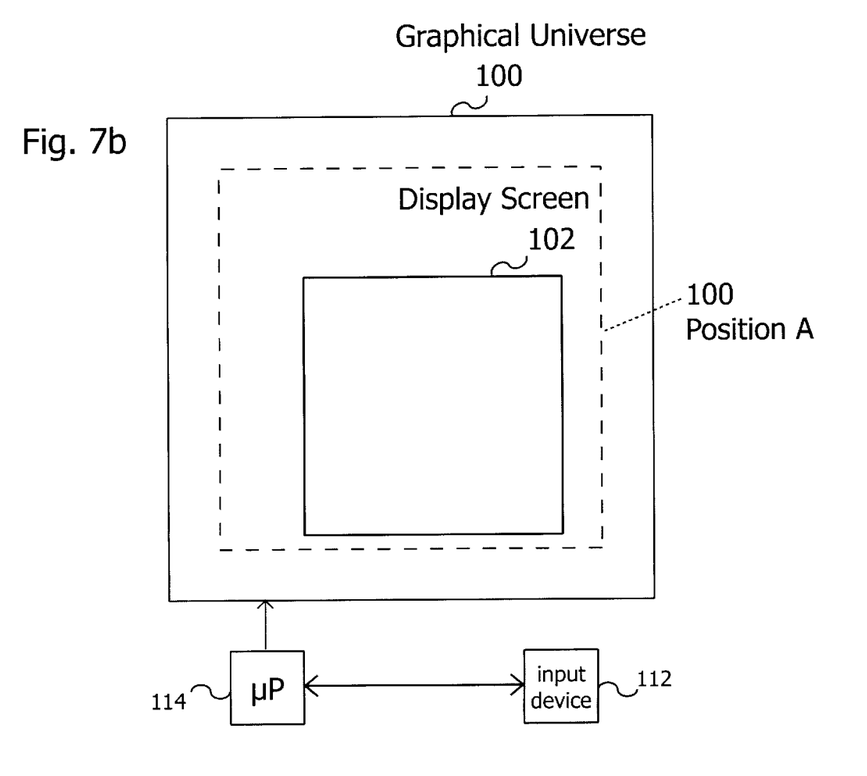

Conversely, if the direction line 126 is long, the speed of the zoom-in/out operation is fast as shown in FIGS. 7a and 7b. The length of the direction line 126 (i.e., the speed of the zoom-in/out operation) is controlled by the movement of the cursor 116 on the display screen 102.

When the user wants to stop zooming, he deactivates the input device 202 (releases the mouse button). The reference location 122 disappears from the display screen 102, and the zoom-in/out operation is discontinued. Alternatively, the user may place the cursor 116 (via the input device 112) substantially at the reference location 122. Since the direction line 126 is practically zero symbolizing no direction and zero speed according to the present invention, the zoom-in/out operation substantially stops.

To summarize, according to the present invention as the cursor 116 (via the input device 112) is moved away from the reference location 122, the direction line 126 from the cursor 116 to the reference location 122 is provided on the display screen 102. The direction line 126 indicates the direction of the zoom operation (that is, whether to zoom-in or zoom-out), and the length of the direction line 126 signifies the speed with which the zoom-in/out operation is carried out.

In contrast to the conventional technique, the present invention provides a one-button, single operation that can be performed using the input device 112. The above-described dynamic control of direction and speed in zooming-in/out further enhances the graphical user interface.

The above-mentioned figures show the cursor 116 being manipulated by the input device 112 under control of the microprocessor 114 which is coupled to the display screen 102 and/or graphical universe 100. It will be appreciated that any other programmable controller may be programmed to carry out the operations of the present invention as described hereinabove with reference to those figures. The present invention may be implemented on a dedicated system having a screen for displaying graphical objects including text, images, etc., an input device for manipulating those objects on the screen, and at least one programmable controller for effecting various functions in the system. Alternatively, the above operations may be performed on a general-purpose personal computer programmed to perform the operations in accordance with the present invention and equipped with an input device such as a mouse, lightpen, touch-screen display, remote control device, etc., and a display monitor.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A method for displaying a graphical space on a screen display, comprising the steps of:
    positioning a cursor at a preselected position on said screen display such that a reference location is fixed at said preselected position;
    providing an object defining a predetermined area on said screen display, said reference location being substantially located on a border of said predetermined area;
    moving said cursor from said reference location on said screen display in a direction in which said graphical space is to be selectively enlarged or reduced on said screen such that a line between said cursor and said reference location is provided on said screen display to indicate said direction; and
    displaying the enlarged or reduced graphical space on said screen display on the basis of said line.

2. The method according to claim 1, wherein said object has a circular shape.

3. The method according to claim 1, wherein less details in said graphical space are displayed on said screen display when the reduced graphical space is displayed, and more details in said graphical space are displayed on said screen display when the enlarged graphical space is displayed.

4. The method according to claim 1, wherein the reduced graphical space is displayed on said screen display when said line is located inside said object, and the enlarged graphical space is displayed on said screen display when said line is located outside said object.

5. The method according to claim 1, wherein the enlarged or reduced graphical space is selectively displayed on said screen display as long as said cursor is spaced apart from said reference location.

6. The method according to claim 1, wherein said cursor is controlled via an input device.

7. The method according to claim 6, wherein said reference location is fixed on said screen display by depressing a button on said input device and by maintaining said button in a depressed state.

8. The method according to claim 6, wherein said reference location is fixed on said screen display by clicking a button on said input device.

9. The method according to claim 1, further comprising varying a display speed of selectively displaying the enlarged or reduced graphical space on said screen display.

10. The method according to claim 9, wherein the length of said line is indicative of the display speed.

11. The method according to claim 10, wherein said graphical space is enlarged or reduced faster on said screen display if the length of said line is increased, and said graphical space is enlarged or reduced slower on said screen display if the length of said line is decreased.

12. The method according to claim 1, wherein said steps of positioning, providing, moving and displaying are cumulatively referred to as a zoom operation.

13. The method according to claim 12, wherein said zoom operation is selected from a menu displayed on said screen display.

14. The method according to claim 1, wherein said line between said cursor and said reference location may be provided in a direction of 360 degrees with respect to said reference location.

15. Apparatus for displaying a graphical space, comprising:
    a screen display for displaying said graphical space; and
    a programmable controller for positioning a cursor at a preselected position on said screen display such that a reference location is fixed at said preselected position, said programmable controller being operative to provide an object defining a predetermined area on said screen display, said reference location being substantially located on a border of said predetermined area, said programmable controller being operative to move said cursor from said reference location on said screen display in a direction in which said graphical space is to be selectively enlarged or reduced on said screen display such that a line between said cursor and said reference location is provided on said screen display to indicate said direction, said programmable controller being operative to selectively display the enlarged or reduced graphical space on said screen display on the basis of said line.

16. The apparatus according to claim 15, wherein said screen display displays the reduced graphical space when said line is located inside said object, and said screen display displays the enlarged graphical space when said line is located outside said object.

17. The apparatus according to claim 15, wherein said programmable controller is operative to vary a display speed of selectively displaying the enlarged or reduced graphical space on said screen display in response to a length of said line.

18. The apparatus according to claim 17, wherein the length of said line is indicative of the display speed.

* * * * *